United States Patent
Schäffler et al.

(10) Patent No.: US 10,107,292 B2
(45) Date of Patent: Oct. 23, 2018

(54) VACUUM / BLOWER DEVICE

(71) Applicant: Andreas Stihl AG & Co. KG, Waiblingen (DE)

(72) Inventors: Kevin Schäffler, Untergruppenbach (DE); Cornelius Gindele, Plochingen (DE); Markus Hittmann, Weinstadt (DE); Christian Barth, Leutenbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 253 days.

(21) Appl. No.: 15/016,755

(22) Filed: Feb. 5, 2016

(65) Prior Publication Data
US 2016/0238010 A1 Aug. 18, 2016

(30) Foreign Application Priority Data
Feb. 12, 2015 (DE) .......................... 10 2015 001 811

(51) Int. Cl.
| | |
|---|---|
| *F04D 19/00* | (2006.01) |
| *A01G 20/43* | (2018.01) |
| *F02B 63/02* | (2006.01) |
| *A47L 5/14* | (2006.01) |
| *F04D 25/06* | (2006.01) |
| *E01H 1/08* | (2006.01) |

(52) U.S. Cl.
CPC ............ *F04D 19/005* (2013.01); *A01G 20/43* (2018.02); *A47L 5/14* (2013.01); *E01H 1/08* (2013.01); *F04D 25/06* (2013.01); *F02B 63/02* (2013.01)

(58) Field of Classification Search
CPC ........ F04D 19/005; F04D 25/06; F02B 63/02; E01H 1/08; A01G 1/125; A47L 5/14
See application file for complete search history.

(56) References Cited

U.S. PATENT DOCUMENTS

| | | | | |
|---|---|---|---|---|
| 6,141,823 | A | * 11/2000 | Fujiwara | .................. A47L 5/14 15/330 |
| 2003/0210994 | A1* | 11/2003 | Boyd | .................... F04D 25/084 417/423.1 |
| 2004/0010360 | A1* | 1/2004 | Kishibata | ................ F02B 63/04 123/3 |

(Continued)

FOREIGN PATENT DOCUMENTS

| | | |
|---|---|---|
| EP | 1 232 717 A2 | 8/2002 |
| JP | 2001-218705 A | 8/2001 |
| WO | 2014/030755 A1 | 2/2014 |

*Primary Examiner* — Essama Omgba
*Assistant Examiner* — Christopher Brunjes
(74) *Attorney, Agent, or Firm* — Gudrun E. Huckett

(57) ABSTRACT

A vacuum/blower device is provided with a drive motor and a fan operatively connected to the drive motor and driven by the drive motor. A switching device is provided that switches the vacuum/blower device from a vacuum operation to a blower operation and from the blower operation to the vacuum operation. A suction pipe with an intake opening is provided, wherein, in the vacuum operation of the vacuum/blower device, a suction air flow is sucked in from the intake opening toward the fan in a first flow direction. The switching device switches a rotational direction of the fan, wherein the fan in the blower operation conveys a blower air flow through the suction pipe in a second flow direction that is oriented from the fan toward the intake opening.

12 Claims, 3 Drawing Sheets

(56) References Cited

U.S. PATENT DOCUMENTS

2009/0241285 A1   10/2009  Hinklin et al.
2013/0017079 A1*   1/2013  Armstrong ................ A47L 5/14
                                                          415/204
2015/0211535 A1*   7/2015  Kodato ..................... A47L 5/14
                                                          417/371

* cited by examiner

VACUUM / BLOWER DEVICE

BACKGROUND OF THE INVENTION

The invention relates to a vacuum/blower device that sucks in a suction air flow through the suction pipe of the vacuum/blower device in vacuum operation, wherein the fan of the vacuum/blower device is driven by a drive motor, wherein the flow direction of the suction air flow is oriented from an intake opening of the suction pipe toward the fan, and wherein the vacuum/blower device comprises a switching device for switching from vacuum operation to blower operation and vice versa.

JP 2001-218705 A discloses a vacuum/blower device comprising a suction pipe. In addition, a blower pipe is provided. For switching between vacuum operation and blower operation, a valve is provided that, in the valve position for suction operation, conveys the sucked-in air flow through an outlet opening for collected material and, in a second valve position for blower operation, conveys the air flow, sucked in via the suction pipe, through the blower pipe that is arranged parallel to the suction pipe.

The invention has the object to design a vacuum/blower device of the aforementioned kind such that it has a simple configuration.

SUMMARY OF THE INVENTION

In accordance with the present invention, this is achieved in that the switching device of the vacuum/blower device switches the rotational direction of the fan and in that the fan, in blower operation, conveys a blower air flow through the suction pipe, wherein the blower air flow has a flow direction oriented from the fan toward the intake opening.

It is provided that the switching device switches the rotational direction of the fan. In blower operation, the fan conveys a blower air flow through the suction pipe, wherein the blower air flow has a flow direction that is oriented from the fan toward the intake opening, i.e., is oriented opposite to the flow direction in vacuum operation. Accordingly, only a single pipe for vacuum operation and blower operation is required. The air for blower operation can therefore be sucked in from an area that is arranged remote from the intake opening of the suction pipe. Only one suction pipe is required through which, in vacuum operation, air and material to be collected are sucked in and through which, in blower operation, air can be blown out.

Advantageously, the switching device comprises a gearbox by means of which the drive motor drives the fan. By appropriate configuration of the different gear stages, different rotational speeds for vacuum operation and blower operation are possible in a simple way. This is in particular advantageous when the drive motor is an internal combustion engine. However, it can also be provided that the drive motor is an electric motor. In this context, the electric motor can then be supplied with energy through a power cable or by means of a battery or a rechargeable battery pack. A simple configuration results when the switching device switches the rotational direction of the electric motor.

In order to achieve a good conveying performance in vacuum operation as well as in blower operation, it is advantageously provided that the fan is an axial fan with at least one fan wheel. Preferably, the fan is arranged in the suction pipe. This provides a compact configuration. The fan is in particular arranged coaxial to the longitudinal center axis of the suction pipe. The conveyed air flows in this context advantageously into an annular space through which the fan wheel conveys the air flow. Within the annular space, a housing can be provided in which the drive motor as well as additional components of the power tool can be arranged. In vacuum operation, the fan is utilized advantageously for comminuting the collected material.

Advantageously, the vacuum/blower device has an inlet opening which is upstream of the suction pipe in blower operation and through which the fan can sucked in air in blower operation. Advantageously, the vacuum/blower device comprises an outlet opening for collected material which is arranged downstream of the suction pipe in vacuum operation. The suction pipe is therefore advantageously connected with three openings, i.e., the intake opening for vacuum operation through which air is blown out in blower operation; an inlet opening for sucking in air for the blower operation; as well as an outlet opening for blowing out collected material in vacuum operation. Advantageously, the vacuum/blower device comprises a valve that, in a first switching position, produces a connection connecting the suction pipe with the inlet opening and, in a second switching position, produces a connection connecting the suction pipe with the outlet opening. In the first switching position, the vacuum/blower device is therefore configured for blower operation and, in the second switching position of the valve, configured for vacuum operation.

A simple configuration results when the valve is a ball valve. A ball valve enables a favorable flow guiding action within the valve as well as a great flow cross-section while having comparatively minimal outer dimensions. However, it can also be provided that the valve is designed as a pivotable flap. In the configuration of the valve as a pivotable flap, it can be provided that the switching position of the valve is automatically adjusted as a function of the pressure conditions at the flap. The pressure conditions at the flap change in this context by switching the rotational direction of the fan. It is particularly preferred however that the switching position of the switching device is coupled to the switching position of the valve. For switching between vacuum operation and blower operation, the operator must therefore only switch the valve. The switching position of the switching device and thus the rotational direction of the fan are automatically adjusted also. Alternatively, it can also be provided that the operator must switch the switching device and the switching position of the valve is automatically appropriately adjusted. A simple configuration results when the switching device comprises a switch which is actuated by the valve body of the valve. In particular in case of the drive motor being configured as an electric motor, switching of the rotational direction by appropriate pole change of the drive motor can be realized in a simple way by means of the switch that is actuated by the valve body of the valve.

DESCRIPTION OF THE PREFERRED EMBODIMENTS

Figure 1:
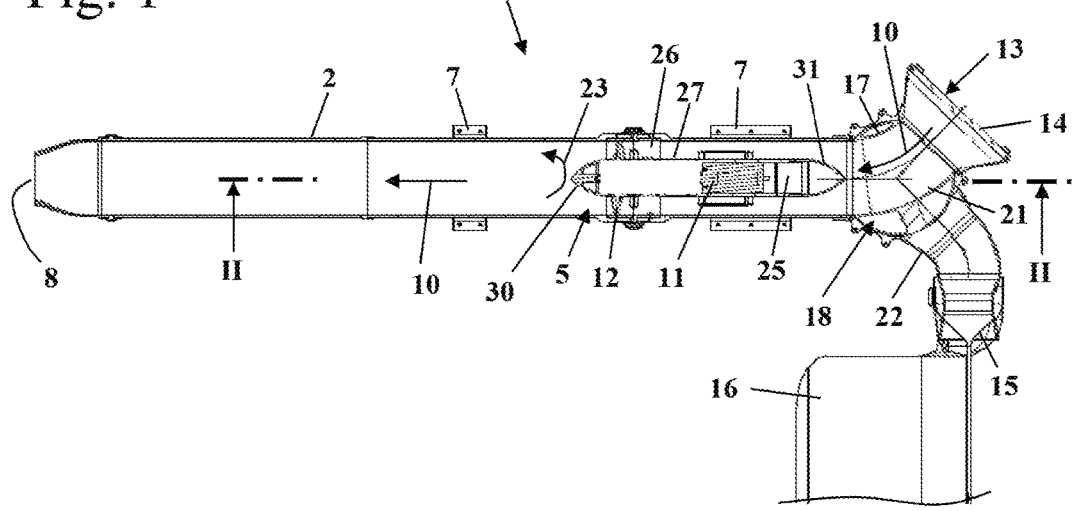
FIG. 1 is a schematic section illustration of a vacuum/blower device in a first switching position for blower operation.

In FIG. 1, a vacuum/blower device 1 is schematically illustrated. The vacuum/blower device 1 can be utilized for sucking in material to be collected such as leaves or the like as well as for blowing off dirt, leaves or the like. The vacuum/blower device 1 comprises a suction pipe 2 in which a fan 5 is arranged. The fan 5 is designed as an axial fan and comprises one fan wheel 12 in the embodiment. However, a plurality of fan wheels 12 can be provided. Also, one or a plurality of guide wheels that are fixedly secured within the suction pipe 2 can be provided. The vanes of the fan wheel 12 circulate within an annular space 26 that is delimited inwardly by an inner wall 27 and at its outer side by the suction pipe 2. Preferably, the fan wheel 12 forms a section of the inner wall 27. In the embodiment, within the inner wall 27 an electric motor 11 as well as a control unit 25 for the electric motor 11 are arranged. The electric motor 11 serves for driving the fan 5. The electric motor 11 and/or the control unit 25 can also be arranged outside of the suction tube 2. In FIG. 1, the vacuum/blower device 1 is illustrated in the position for blower operation. In this switching position, the fan wheel 12 rotates in a first rotational direction 23 and conveys a blower air flow in the flow direction 10 through the suction pipe 2. The suction pipe 2 comprises an intake opening 8 through which the air flow conveyed by the fan 5 exits in blower operation of the device.

Relative to the flow direction 10 in blower operation, a first guiding element 30 is provided at the downstream end of the inner wall 27 and a second guiding element 31 is provided at the upstream end of the inner wall 27. In the embodiment, the guiding elements 30 and 31 each are designed as a rounded cone at their outer circumference and reduce the flow resistance in the suction pipe 2. Relative to the flow direction 10, a valve 17 is provided upstream of the fan 5. FIG. 1 shows the valve 17 in a first switching position 18 which is correlated with the blower operation. In this switching position, a pipe section 21 formed within the valve 17 connects the suction pipe 2 with an inlet opening 13 through which the blower air is sucked in from the environment. In the embodiment, the inlet opening 13 is covered by a screen 14 in order to prevent that large objects are sucked into the suction pipe 2. The inlet opening 13 is arranged at an end of the suction pipe 2 which is facing away from the intake opening 8.

A pipe socket 22 opens at the valve 17 and is closed off in the switching position 18 of the valve 17 that is illustrated in FIG. 1. The pipe socket 22 comprises an outlet opening 15 on which a collecting container 16, schematically indicated in FIG. 1, for collected material is secured.

Figure 2:
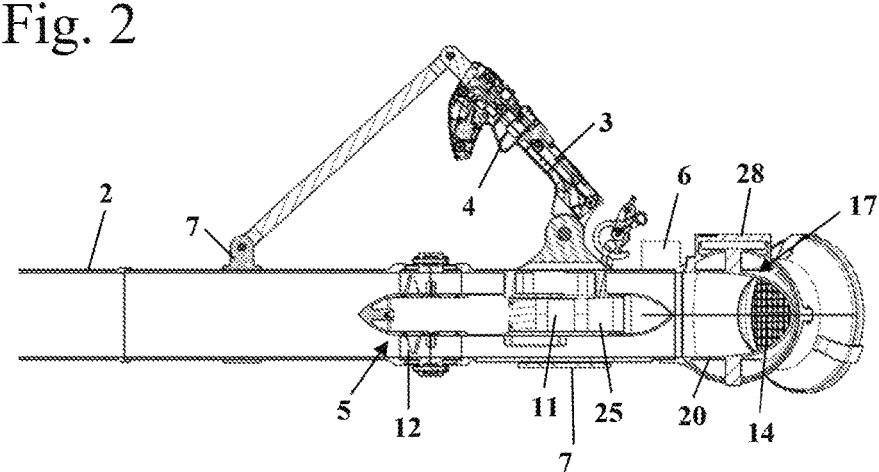
FIG. 2 is a section view along the section line II-II of FIG. 1.

As shown in FIG. 1, on the suction pipe 22 two fastening sleeves 7 are provided. As shown in FIG. 2, the fastening sleeves 7 serve for fixation of a handle 3 by which the vacuum/blower device 1 can be carried and guided by an operator. At the handle 3, an operating element 4, schematically indicated in FIG. 2, for operating the electric motor 11 is pivotably supported.

Figure 3:
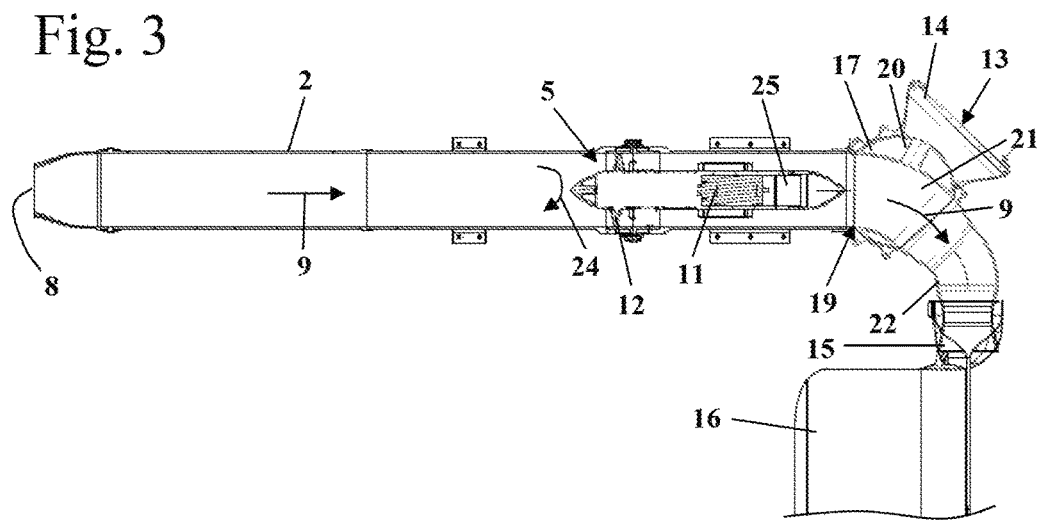
FIG. 3 is a schematic section illustration of the vacuum/blower device of FIG. 1 in a second switching position for vacuum operation.

As shown in FIG. 2, the vacuum/blower device 1 comprises a switching device 6. The switching device 6 serves for switching the rotational direction of the fan 5. The switching device 6 can comprise, for example, a switch which is to be actuated by the operator. As shown in FIG. 2, the valve 17 comprises an operating element 28 that serves for switching the valve 17 from the first switching position 18 for blower operation, illustrated in FIGS. 1 and 2, into the second switching position 19 for vacuum operation, illustrated in FIG. 3, and vice versa. In the embodiment, the operating element 28 is designed as a turn knob with which the valve body 20 of the valve 17 can be adjusted into the switching positions, respectively. The valve member 20 is approximately spherical. In the valve body 20, a curved pipe section 21 is extending. In order to switch the vacuum/blower device 1 from the position for blower operation, illustrated in FIGS. 1 and 2, into the position for vacuum operation, illustrated in FIG. 3, the operator must adjust the valve body 20 of the valve 17 by means of the operating element 28 and move the valve 17 from the first switching position illustrated in FIG. 1 into the second switching position 19 illustrated in FIG. 3. Also, the operator must actuate the switching device 6 in order to switch the rotational direction of the fan 5. The rotational direction of the fan 5 is advantageously switched by pole change of the electric motor 11. As shown in FIG. 3, in vacuum operation the fan wheel 12 rotates in a second rotational direction 24 which is opposite to the first rotational direction 23 in blower operation.

In the second switching position 19, the pipe section 21 in the valve 17 connects the suction pipe 2 with the pipe socket 22 and the outlet opening 15 formed on the pipe socket 22. The second rotational direction 24 of the fan 5 conveys the suction air flow in the flow direction 9 through the suction pipe 2, wherein the flow direction is oriented from the intake opening 8 toward the outlet opening 15. In vacuum operation, material to be collected, such as leaves or the like, is thus sucked in through the intake opening 8, passes through the annular space 26 at the fan wheel 12 and is thereby comminuted, and is then conveyed through valve 17 and the pipe socket 22 into the collecting container 16 which is arranged at the outlet opening 15. The valve 17 is designed as a ball valve. The diameter of the free flow cross-section in the valve 17 is somewhat greater than the radius of the valve body 20. In this way, a very large flow cross-section can be achieved even though the size of the valve 17 is small. As also shown in FIG. 3, in the second switching position 19 of the valve 17 the inlet opening 13 is closed off by the valve body 20. Accordingly, no air can be sucked in through the inlet opening 13 or blown out through the inlet opening 13.

Figure 4:
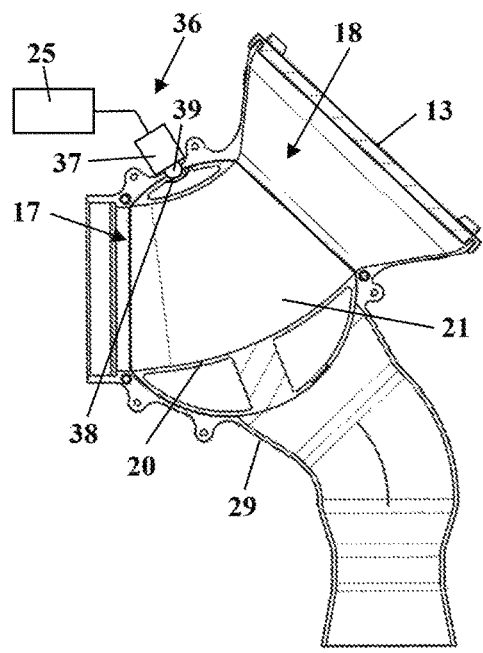
FIG. 4 is a section illustration of an embodiment for a switching device in the switching position for blower operation.
Figure 5:
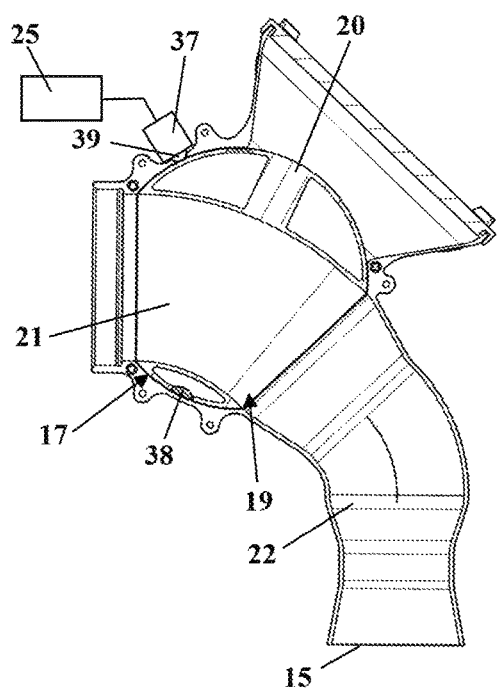
FIG. 5 is a section illustration of the switching device of FIG. 4 in the switching position for vacuum operation.

FIGS. 4 and 5 show an embodiment of a switching device 36 which is arranged on a valve 17. The switching device 36 comprises a switch 37 which is actuated by the valve body 20 of the valve 17. The switch 37 comprises a sensing member 39 which is positioned on the exterior wall of the valve body 20. In the first switching position 18 illustrated in FIG. 4, the sensing member 39 is positioned in a recess 38 on the exterior side of the valve body 20. The switch 37 is connected to the control unit 25 that recognizes through the switching position of the switch 37 that the valve 17 is in its first switching position 18. In this switching position 18, the pipe section 21 connects the suction pipe 2 (FIG. 1) with the inlet opening 13.

FIG. 5 shows the valve 17 in the second switching position 19 for vacuum operation. In this switching position 19, the pipe section 21 in the valve body 20 of the valve 17 connects the suction pipe 2 (FIG. 3) with the pipe socket 22 and with the outlet opening 15 that communicates with the collecting container 16. In this position 19, the sensing member 39 is contacting a spherical section of the valve body 20. The sensing member 39 is pushed in farther than in the position illustrated in FIG. 4. The control unit 25 can therefore recognize that the valve 17 is in the second switching position 19. Preferably, the switch 37 is arranged such that the control unit 25 also recognizes intermediate positions of the valve 17 with the electric motor 11 not being driven, for example, in these intermediate positions.

Figure 6:
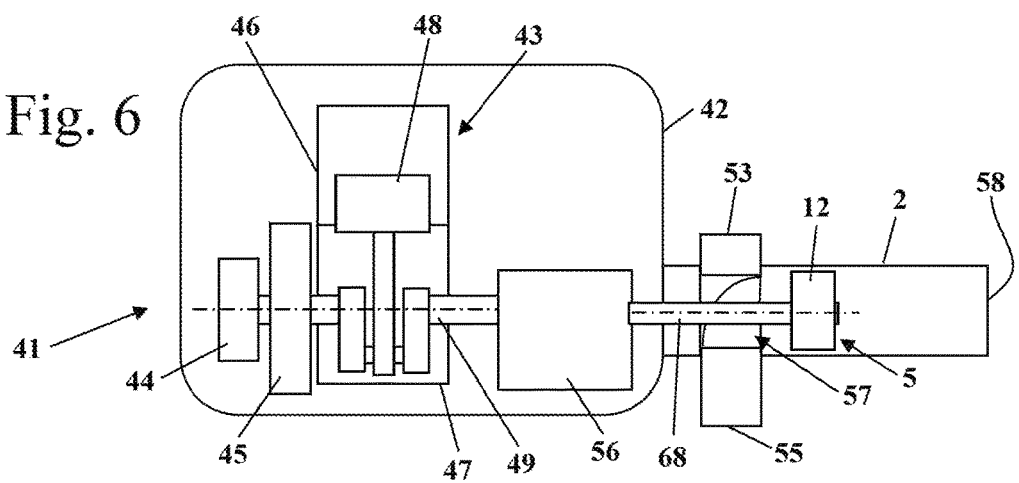
FIG. 6 is a schematic illustration of an embodiment of a vacuum/blower device.

FIG. 6 shows a further embodiment of a vacuum/blower device 41. The vacuum/blower device 41 comprises a housing 42 in which an internal combustion engine 43 is arranged as a drive motor. The internal combustion engine 43 comprises a starter device 44. In the embodiment, a blower wheel 45 for conveying cooling air is provided between the starter device 44 and a crankcase 47 of the internal combustion engine 43. The internal combustion engine 43 comprises a cylinder 46 in which a piston 48 is driven reciprocatingly. The piston 48 drives a crankshaft 49 in rotation. The crankshaft 49 is rotatably supported in the crankcase 47. The internal combustion engine 43 can be, for example, a two-stroke engine, in particular a two-stroke engine operating with scavenging action, or a four-stroke engine, in particular a mixture-lubricated four-stroke engine. The crankshaft 49 is connected by means of a switching device 56 with a drive shaft 68. The switching device 56 serves for reversing the rotational direction of the drive shaft 68. The drive shaft 68 drives a fan wheel 12 of the fan 5 in rotation. The fan 5 is arranged in a suction pipe 2. The constructive configuration corresponds advantageously substantially to the configuration illustrated in FIGS. 1 to 3.

The suction pipe 2 comprises an intake opening 58. In the embodiment, the valve 57 is arranged on the side of the fan 5 which is opposite to the intake opening 58 and connects the interior of the suction pipe 2 either with an inlet opening 53 or an outlet opening 55. For switching the vacuum/blower device 41 from vacuum operation to blower operation and vice versa, the operator must switch by means of the switching device 56 the rotational direction of the drive shaft 68 and also, by actuation of the valve 57, must change the connection established between the suction pipe 2 and the inlet opening 53 or established between the suction pipe 2 and the outlet opening 55. In this context, the intake opening 58 is to be connected with the inlet opening 53 in blower operation and with the outlet opening 55 in vacuum operation.

Figure 7:
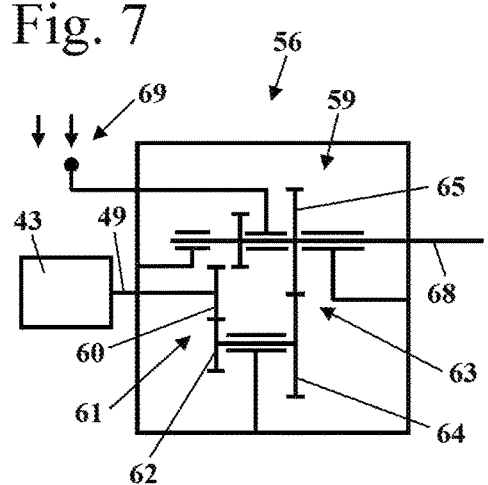
FIG. 7 is a schematic illustration of a switching device in the first switching position.
Figure 8:
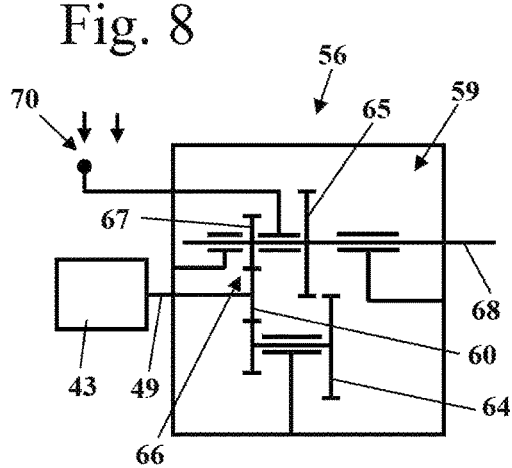
FIG. 8 is a schematic illustration of the switching device of FIG. 7 in a second switching position.

FIGS. 7 and 8 shows schematically the configuration of the switching device 56. The switching device 56 comprises a gearbox 59 that comprises an input gear 60 connected to the crankshaft 49. FIG. 7 shows the switching device 56 in a first switched gear position 69 and FIG. 8 shows the switching device 56 in the second switched gear position 70. In the first switched gear position 69 illustrated in FIG. 7, the crankcase 49 and the drive shaft 68 rotate in the same direction. The crankshaft 49 is connected by a first gear stage 61 and a second gear stage 63 with the drive shaft 68. The first gear stage 61 comprises the input gear 60 as well as a second gear 62 which is meshing with the input gear 60. In the embodiment, the gears 60 and 62 have the same number of teeth. The second gear stage 63 comprises a first gear 64 and a second gear 65 which is meshing with the first gear 64. The first gear 64 is rotationally fixedly connected with the second gear 62 of the first gear stage 61. The second gear 65 is fixedly connected to the drive shaft 68. The gears 64 and 65 also have the same number of teeth. Accordingly, the rotary speed of the drive shaft 68 of the fan 5 is of the same magnitude as the rotary speed of the crankshaft 49.

In the second switched gear position 70 illustrated in FIG. 8, the connection between the first gear 64 and the second gear 65 of the second gear stage 63 is interrupted. The input gear 60 engages a second gear 67 and forms therewith a first gear stage 66. The second gear 67 is fixedly connected to the drive shaft 68. Preferably, the second gear 67 has the same number of teeth as the input gear 60 so that the crankshaft 49 and the drive shaft 68 have the same rotary speed. The rotational directions of the crankshaft 49 and of the drive shaft 68 are oppositely oriented. By means of the switching device 56, a switching of the rotational direction of the fan 5 can be achieved in a simple way. The gearbox 59 of the switching device 56 can also be used in connection with an electric motor. In order to achieve a simple operation, the switched gear positions 69 and 70 of the switching device 56 can be coupled to the position of the valve 57 (FIG. 6). When the operator switches the valve 57, automatically also the switching state of the switching device 56 is changed or reversed.

Figure 9:
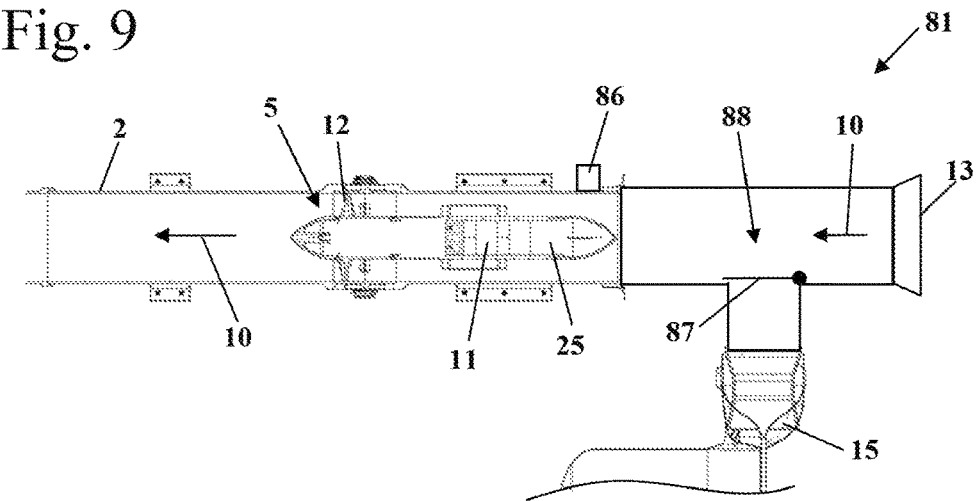
FIG. 9 is a schematic section illustration of an embodiment of a vacuum/blower device in a switching position for blower operation.
Figure 10:
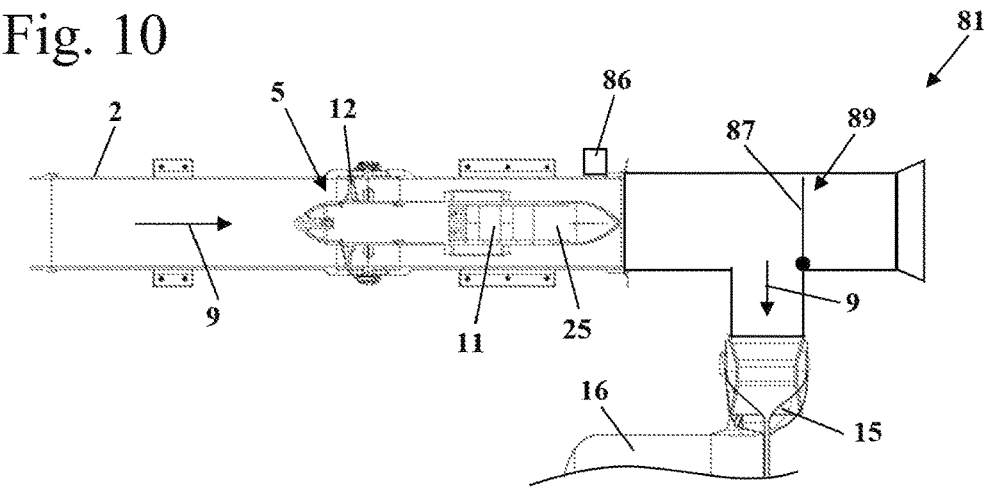
FIG. 10 is a schematic section illustration of the vacuum/blower device of FIG. 9 in the switching position for vacuum operation.

FIGS. 9 and 10 show an embodiment of a vacuum/blower device 81 whose configuration substantially corresponds to the configuration of the vacuum blower device 1. Same reference characters indicate in all Figures those elements that are corresponding with each other. The vacuum/blower device 81 comprises a valve 87. FIG. 9 shows the blower device 81 in the position for blower operation. In blower operation, the valve 87 is in a first switching position 88 in which the inlet opening 13 is connected with the suction pipe 2 and the connection to the outlet opening 15 is closed. The fan 5 conveys through the suction pipe 2 an air flow in the flow direction 10. The air is sucked in through the inlet opening 13 into the suction pipe 2. For switching from vacuum operation to blower operation and vice versa, a switching device 86 as well as a valve 87 are provided. The switching device 86 is to be actuated by the operator and reverses or changes the rotational direction of the fan 5.

In FIG. 10, the valve 87 that is designed as a flap is shown in a second switching position 89. In this position, the valve 87 closes the connection to the inlet opening 13 and connects the suction pipe 2 with the outlet opening 15 on which a collecting container 16 for collected material is arranged. It can be provided that the valve 87 is to be switched by the operator from the first switching position 88 to the second switching position 89 and vice versa. Advantageously, the switching device 86 is coupled to the position of the valve 87 so that the operator must only switch the valve 87 and the switching device 86 is switched into the correlated switching position when the valve 87 is adjusted. However, it can also be provided that the operator switches only the switching device 86 and the valve 87 is switched as a result of the pressure conditions which are existing within the suction pipe 2. For this purpose, the valve 87 is advantageously supported in a springy fashion in the direction of the second switching position 89 that is shown in FIG. 10. When the vacuum/blower device 81 is switched from the position for vacuum operation, illustrated in FIG. 10, into the position for blower operation, illustrated in FIG. 9, the vacuum in the suction pipe 2 effects pivoting of the valve 87 into the first switching position 88. This is realized as a result of the increased flow resistance in the collecting container 16. A different actuation of the valve 87 can be provided also. Instead of being driven by an electric motor, the vacuum/blower device 81 can also be driven by an internal combustion engine.

The specification incorporates by reference the entire disclosure of German priority document 10 2015 001 811.6 having a filing date of Feb. 12, 2015.

While specific embodiments of the invention have been shown and described in detail to illustrate the inventive principles, it will be understood that the invention may be embodied otherwise without departing from such principles.

What is claimed is:

1. A vacuum/blower device comprising:
a drive motor;
a fan operatively connected to the drive motor and driven by the drive motor;
a switching device configured to switch the vacuum/blower device from a vacuum operation to a blower operation and from the blower operation to the vacuum operation;
a suction pipe comprising an intake opening, wherein, in the vacuum operation of the vacuum/blower device, a suction air flow is sucked in from the intake opening toward the fan in a first flow direction;
an inlet opening that is arranged upstream of the suction pipe in the blower operation, wherein the fan in the blower operation sucks in air through the inlet opening;
an outlet opening arranged downstream of the suction pipe in the vacuum operation, wherein material collected in the vacuum operation through the intake opening exits through the outlet opening;
a valve that, in a first switching position of the valve, produces a connection connecting the intake opening of the suction pipe with the inlet opening and, in a second switching position of the valve, produces a connection connecting the intake opening of the suction pipe with the outlet opening;
wherein the switching device switches a rotational direction of the fan, wherein the fan in the blower operation conveys a blower air flow through the suction pipe in a second flow direction that is oriented from the fan toward the intake opening.

2. The vacuum/blower device according to claim 1, wherein the switching device comprises a gearbox operatively connected to the drive motor, wherein the drive motor drives the axial fan through the gearbox.

3. The vacuum/blower device according to claim 1, wherein the drive motor is an internal combustion engine.

4. The vacuum/blower device according to claim 1, wherein the drive motor is an electric motor.

5. The vacuum/blower device according to claim 4, wherein the switching device switches a rotational direction of the electric motor.

6. The vacuum/blower device according to claim 1, wherein the fan is an axial fan comprising at least one fan wheel.

7. The vacuum/blower device according to claim 1, wherein the fan is arranged within the suction pipe.

8. The vacuum/blower device according to claim 1, wherein the valve is a ball valve.

9. The vacuum/blower device according to claim 1, wherein the valve is a pivotable flap, wherein the pressure conditions at the flap change by switching the rotational direction of the fan, and wherein the valve is adjusted automatically as a function of the pressure conditions at the flap into the first and second switching positions.

10. A vacuum/blower device comprising:
a drive motor;
a fan operatively connected to the drive motor and driven by the drive motor;
a switching device configured to switch the vacuum/blower device from a vacuum operation to a blower operation and from the blower operation to the vacuum operation;
a suction pipe comprising an intake opening, wherein, in the vacuum operation of the vacuum/blower device, a suction air flow is sucked in from the intake opening toward the fan in a first flow direction;
an inlet opening that is arranged upstream of the suction pipe in the blower operation, wherein the fan in the blower operation sucks in air through the inlet opening;
an outlet opening arranged downstream of the suction pipe in the vacuum operation, wherein material collected in the vacuum operation through the intake opening exits through the outlet opening;
a valve that, in a first switching position of the valve, produces a connection connecting the suction pipe with the inlet opening and, in a second switching position of the valve, produces a connection connecting the suction pipe with the outlet opening;
wherein the switching device switches a rotational direction of the fan, wherein the fan in the blower operation conveys a blower air flow through the suction pipe in a second flow direction that is oriented from the fan toward the intake opening;
wherein a switching position of the switching device is coupled to the first and second switching positions of the valve so that the valve is automatically switched between the first switching position and the second switching position when an operator switches the switching device for switching the rotational direction of the fan.

11. The vacuum/blower device according to claim 10, wherein the switching device comprises a switch that is actuated by a valve body of the valve.

12. A vacuum/blower device comprising:
a drive motor;
a fan operatively connected to the drive motor and driven by the drive motor;
a switching device configured to switch the vacuum/blower device from a vacuum operation to a blower operation and from the blower operation to the vacuum operation;
a suction pipe comprising an intake opening, wherein, in the vacuum operation of the vacuum/blower device, a suction air flow is sucked in from the intake opening toward the fan in a first flow direction;
an inlet opening that is arranged upstream of the suction pipe in the blower operation, wherein the fan in the blower operation sucks in air through the inlet opening;
an outlet opening arranged downstream of the suction pipe in the vacuum operation, wherein material collected in the vacuum operation through the intake opening exits through the outlet opening;
a valve that, in a first switching position of the valve, produces a connection connecting the suction pipe with the inlet opening and, in a second switching position of the valve, produces a connection connecting the suction pipe with the outlet opening;
wherein the switching device switches a rotational direction of the fan, wherein the fan in the blower operation conveys a blower air flow through the suction pipe in a second flow direction that is oriented from the fan toward the intake opening;

wherein a switching position of the switching device is coupled to the first and second switching positions of the valve so that the switching device automatically switches the rotational direction when an operator switches the valve from the first switching position into the second switching position or from the second switching position into the first switching position.

\* \* \* \* \*